(No Model.) 2 Sheets—Sheet 1.
J. E. SEARING.
SPECTACLE OR EYEGLASS FRAME.
No. 400,956. Patented Apr. 9, 1889.
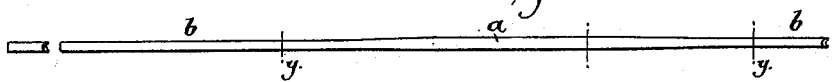
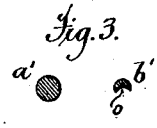
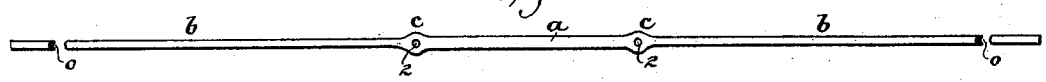
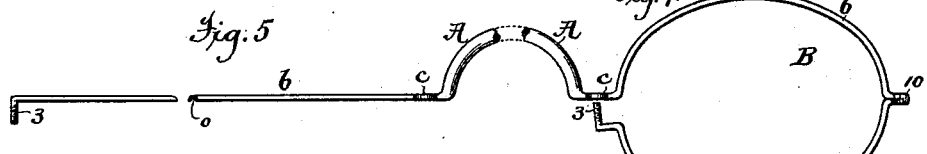
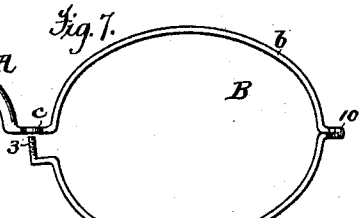
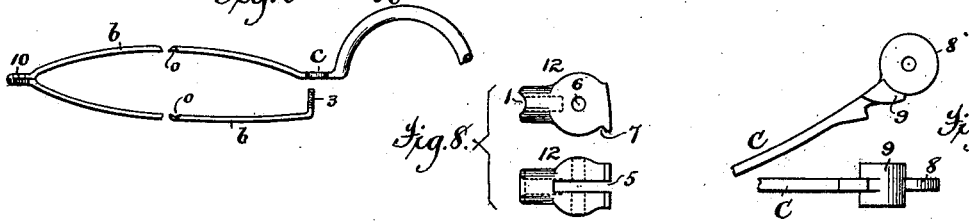
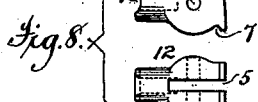
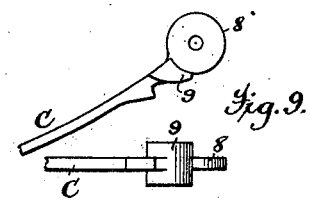
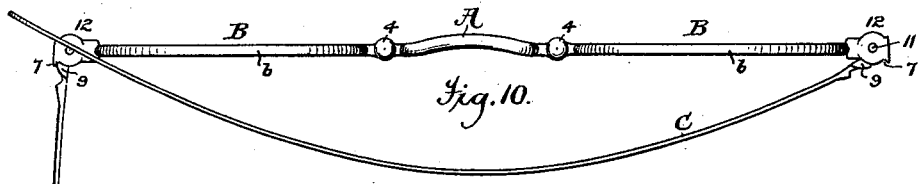
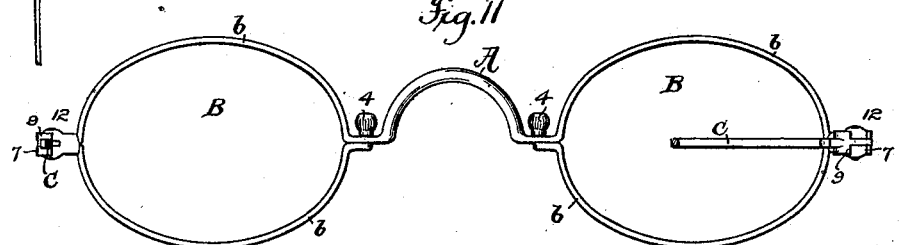
Attest:
Geo. H. Botts
J. A. Hovay
Inventor:
James E. Searing
By Geo. H. Graham
Atty.

(No Model.) 2 Sheets—Sheet 2.
J. E. SEARING.
SPECTACLE OR EYEGLASS FRAME.

No. 400,956. Patented Apr. 9, 1889.

Attest:
Geo H Bolts
J. A. Hovay

Inventor:
James E. Searing,
by Geo. H. Graham
atty.

UNITED STATES PATENT OFFICE.

JAMES E. SEARING, OF NEW YORK, N. Y.

SPECTACLE OR EYEGLASS FRAME.

SPECIFICATION forming part of Letters Patent No. 400,256, dated April 9, 1889.

Application filed August 19, 1886. Serial No. 211,300. (No model.)

*To all whom it may concern:*

Be it known that I, JAMES E. SEARING, a citizen of the United States, residing at the city, county, and State of New York, have invented certain new and useful Improvements in Spectacle or Eyeglass Frames, fully described and represented in the following specification and the accompanying drawings, forming a part of the same.

This invention relates to spectacle and eyeglass frames and the manner of making them, its object being, among other things, to simplify the construction of such frames, to reduce the number of parts forming the same to the minimum, and thus facilitate and cheapen their cost of production.

The present invention consists, briefly, in a blank of a single piece of metal adapted to be formed or shaped to provide the lens-containing rims, the bridge or nose piece, and attaching ends on opposite sides of the lens-rims, to afford suitable means for securing the temple-joint pieces thereto.

It also consists in a blank of a single piece of metal adapted to be formed or shaped as above set forth, and providing means for securely clamping the lenses in their seats in the rims, and at the same time affording means for holding and securing in the rims different-sized lenses.

It also consists in a spectacle-frame formed of a single piece of metal and providing attaching ends for the temple-joint pieces without soldering.

It furthermore consists in the novel temple-joint piece and in various other details of construction and combinations of parts too fully hereinafter described to need preliminary description.

The accompanying drawings illustrate a practical embodiment of the invention, in which—

Figure 15:
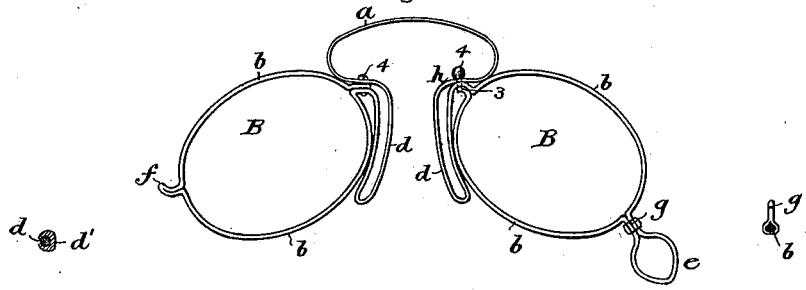
Figure 16:

Figure 1 represents a piece of round wire from which the spectacle or eyeglass frame blank is made. Figs. 2, 3, 4, 5, 6, and 7 illustrate steps taken in the formation of the blank and spectacle-frame. Fig. 8 illustrates enlarged views of the temple-joint piece by plan and side views. Fig. 9 illustrates by similar views the joint end of the temple-piece. Figs. 10 and 11 represent by plan and side views, respectively, the spectacle-frame complete, (one temple-piece in Fig. 10 being only partially shown, and both temple-pieces in Fig. 11 are similarly only partially shown.) Figs. 12, 13, and 14 illustrate modifications of the manner of securing the end of the blank in forming the lens-containing rims. Fig. 15 illustrates by a side elevation an eyeglass-frame made in accordance with this invention, and Fig. 16 illustrates a modification of the spring connecting the two lens-containing rims.

For convenience of description the manner in making a spectacle-frame according to the present invention will be first specifically set forth, and after which will be explained the manner of carrying it out in the formation of an eyeglass-frame.

In practice it has been found that a piece of round wire about three inches in length and of a thickness about equal to the diameter of that necessarily the nose or bridge piece should be is sufficient to form a spectacle-frame. The piece of wire, Fig. 1, will have both of its ends reduced in size, and consequently be much lengthened, by passing each end of the wire between a pair of suitably-grooved rolls and withdrawing the wire before its center is reached, thus leaving its central portion, *a*, untouched and of the original diameter, as seen in Fig. 2 and at *a'* in Fig. 3. The groove in one of the reducing-rolls will preferably be of such shape as to form a groove, *o*, in one side of the ends of the wire, as seen at *b'*, Fig. 3, which represents an enlarged section taken on the lines *y y*, Fig. 2. The wire thus operated upon is provided with a central portion, *a*, circular in form and of a length suited to the size required in the formation of the bridge or nose piece, and preferably a little more, and also with ends *b* extending from said central portion of much reduced size and of a length suited to the proper formation of the lens-containing rims, each having a groove, *o*, extending from their extremities to points nearly adjacent to said central portion, *a*, to provide seats for the lenses. The blank thus far formed is placed in a die or other shaping device, where its central portion, *a*, will be curved into the bridge-like form to provide the nose-piece A. (Shown in Figs. 5, 6, 7, and 11.) Simultaneous therewith (it might be prior or subsequent thereto) the portion of the blank immediately adjacent to said portion *a* will be struck or swaged to form the enlargements *c*, Fig. 4, so that small holes 2 may be provided without materially weakening the blank. Each of the portions *b* of the blank will then have its end bent at right angles thereto to provide studs 3, as in Figs. 5, 6, and 7, which will be compressed to close that portion of the groove therein and then screw-threaded, as shown. As thus far shaped the blank is provided centrally with the bridge or nose piece with enlargements on either side thereof having the small holes, as shown, and with right-angular bent ends providing short studs, and with a groove in each portion *b* extending substantially from the enlargements *c* to said right-angular bends, as shown in the half of the blank, Fig. 5. Both of the portions *b* will be doubled each upon itself at a point substantially midway between the enlargements and the right-angular bends and with the faces of the grooves together, as shown in Fig. 6, (illustrating one half of the blank,) so as to provide an end, 10, which will be compressed to eliminate that portion of the groove and be screw-threaded, as shown, for receiving the temple-joint piece hereinafter described.

The portions of each end of the blank lying between said screw-threaded ends 10 and the enlargements *c* and short studs 3 will now be bent into elliptical form, as shown, in the half of the blank, Fig. 7, thus forming the lens-containing rims B and having the groove *o* extending continuously therearound upon their inner faces. These rims will be so shaped as to preserve the screw-threaded end 10 and the short stud 3, which on the completion of the formation of the rims will bear the relation to the hole 2 in the enlargements *c* as seen in Fig. 7, so that when the portions of the rims are forced together the studs will enter the holes 2 and protrude therethrough, nuts 4 being provided to engage with the ends of the studs and secure them in position.

The temple-joint pieces 12, Fig. 8, consist of a screw-threaded hub adapted to engage with the threads of the ends 10 and be firmly secured thereto. A vertical groove, 1, will preferably be provided in the face of said hub, so that when it is screwed to place the adjacent portions of the rims B will engage therewith and form a good fitting. The joint-pieces will also be provided with a slot, 5, or recess for the knuckle of the temple-pieces C, and be pierced vertically with a hole, 6, for the pivot, and be provided with a back-stop, 7, to limit the opening movement of the temple-piece. The joint-piece thus made will require very few operations to form, and when made will be readily secured to the spectacle ends 10, as was before explained.

The temple-pieces C are substantially of the ordinary form, and are provided with the knuckle 8, pierced with a hole that is engaged by the pivot passed through the hole 6 of the joint-piece. It is provided with an enlargement, 9, the end of which forms the abutment that meets the stop 7 on the joint-piece and limits the opening movement of the temple-piece.

The spectacle-frame thus completed, as seen in Figs. 10 and 11, is assembled and ready to have lenses fitted in its rims without the use of solder or brazing. In fitting the lenses the thumb-nuts 4 will be loosened, and thus allow the rims by their natural spring to spread slightly, and when a lens is found to fit, the thumb-nut will be tightened up and the rim thus secured around the lens and firmly held by the seat formed by the groove therein.

Figure 12:
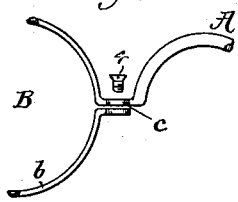
Figure 13:
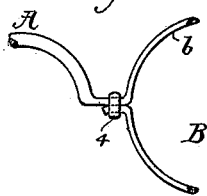

It is obvious that there may be many different modes of securing the free end of rims with the body of the frame. Thus in Fig. 12 said end is flattened and enlarged and provided with a hole, as is the enlargement *c*, and screw-threaded for engagement with a small screw, as shown. In Fig. 13, instead of the enlargements, said end and the body of the frame will be square, made half-round or round, and provided with a securing-sleeve, 4, which, after being slipped over the end, may be secured in place by a slight bend of the end or by any other means.

Figure 14:
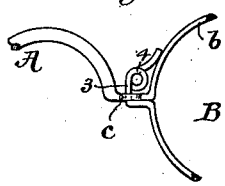

In Fig. 14 the end of the rim is left much longer than before, is passed through the hole in the enlargement *c*, and there bent into spring form with its end bearing upon the lens-rim, (it might be upon the bridge or nose-piece.)

The pivot forming the pintle 11 of the temple-piece C might be a screw engaging with one side of the joint-piece 12, so that as the joint became loose by wear it could by a turn on the screw be compensated for and the temple-piece work as before. The end 10 for said joint-pieces need not be screw-threaded nor the corresponding part of the joint-piece, for said end may be left plain, and the joint-piece, after being forced over it, may be secured in place by swaging or by riveting the two together, as is obvious.

An eyeglass-frame may be formed in substantially the same manner as the spectacle-frame above described.

Referring to Fig. 15, the bridge or nose piece *a*, instead of being left round, as in the former case, will be rolled comparatively thin to provide the usual bridge-spring, and will be carried down and bent upon itself to provide the nose-grasping pieces *d*, and then the blank will be shaped to provide the handle *e* on one portion and an engaging projection, *f*, on the other portion, in a manner similar to that of the ends 10 of the spectacle-frame. The end providing the handle *e* will, however, be spread and otherwise shaped to afford a suitable grasp for the fingers, and will be provided with a pin, *g*, (see detached view,) which will be suitably secured to the neck of the handle *e* and be engaged by the projection *f* when the eyeglass-frame is closed. Two modes are shown of fastening the free end of the rims B, which are provided with the grooves o, affording seats for the lenses in the same manner as was the spectacle-frame blank. The end of the right-hand rim is provided with a stud, 3, as before described, which enters holes provided in blank at the upper extremity of the grasping-piece d, as seen at h, and provided with a securing-nut, 4, as before. In the left-hand rim the free end of the rim is carried up the reverse of that shown in the other rim, and is flattened and inserted between the meeting portions of the grasping-piece d, which at that point is pierced by a hole, as is the end of the rim, and is there secured by a screw, 4.

The faces of the grasping-pieces d may be milled or otherwise roughened, or said faces may be supplemented with a face of vulcanized rubber riveted thereto, as is common; and it is obvious that only the bridge-spring portion a may be flattened, and that the grasping-pieces d might be left round, and a supplemental piece, as d', be sprung over it to afford a suitable grasping-piece for the nose, as in the detached sectional view. It is also apparent that the bridge-piece a may be round and be given the spring-action by providing it with the coil or coils i, as is shown in Fig. 16.

What is claimed is—

1. A blank for a spectacle or eyeglass frame of a single piece from end to end, provided with grooves extending from each end toward the center of the blank and adapted to be formed into lens-containing rims, and the central ungrooved portion adapted to form the bridge-piece and terminating in perforated enlargements, substantially as described.

2. A blank for a spectacle or eyeglass frame of a single piece from end to end, provided with grooves extending from each end toward the center of the blank, which ends are adapted to be doubled each upon itself and formed into lens-containing rims, and the central portion of the blank adapted to form the bridge-piece and terminating in perforated enlargements, substantially as described.

3. A blank for a spectacle or eyeglass frame of a single piece from end to end, provided with grooves extending from each end toward the center of the blank and adapted to be formed into lens-containing rims, and the extremity of each end provided with means adapting it to be secured to the body of the blank at or near the central portion, and the central ungrooved portion adapted to form the bridge-piece and terminating in flattened enlargements, with which said ends engage, substantially as described.

4. A spectacle or eyeglass frame consisting of lens-containing rims provided with grooves extending from each end toward the center of the frame, and a bridge-piece terminating in perforated enlargements, said rims each having a side projection formed therewith, the whole being made from a single piece of metal continuous from end to end, substantially as described.

5. A spectacle or eyeglass frame consisting of lens-containing rims and a bridge-piece made from a single piece of metal continuous from end to end, and having perforated enlargements upon opposite sides of the bridge-piece, each of said ends being secured to the body of the frame by being passed through the perforations in said enlargements, substantially as described.

6. A spectacle or eyeglass frame consisting of lens-containing rims and a bridge-piece terminating in perforated enlargements, said rims each having a side projection formed therewith, the whole being made from a single piece of metal continuous from end to end, and each of said ends being secured to the body of the frame by engagement with said perforated enlargements, substantially as described.

7. A spectacle or eyeglass frame consisting of lens-containing rims and a bridge-piece made from a single piece of metal having free ends detachably secured to the body of the frame at the base of the bridge-piece, substantially as described.

8. A spectacle or eyeglass frame made of a single piece of metal having a bridge-piece and two lens-containing rims, said rims being formed by curving each of the ends of the blank from which the frame is made back upon itself, and which are adjustably connected to the body of the frame at the base of the bridge-piece, so as to be capable of varying the size of the rims within small limits, substantially as described.

9. A spectacle-frame made from a single piece of metal having lens-containing rims and a bridge-piece, said rims carrying projecting attaching ends formed therewith, and temple-joint pieces formed separately therefrom and adapted to be secured to said attaching ends, substantially as described.

10. A spectacle-frame made from a single piece of metal having lens-containing rims and a bridge-piece, said rims being each provided with an attaching end formed continuous therewith by doubling the metal upon itself and adapted to receive and secure a temple-joint piece, and the end of each rim terminating in a stud adjustably secured to the frame at the base of the bridge-piece by a thumb-nut, substantially as described.

In testimony whereof I have hereunto set my hand in the presence of two subscribing witnesses.

JAMES E. SEARING.

Witnesses:
JAS. J. KENNEDY,
GEO. H. GRAHAM.